United States Patent [19]

Myers

[11] Patent Number: 5,234,189
[45] Date of Patent: Aug. 10, 1993

[54] SEAT ASSEMBLY WITH IRREVERSIBLE PAWL ADJUSTING LATCH MECHANISM

[75] Inventor: Timothy S. Myers, Northville, Mich.
[73] Assignee: Hoover Universal, Inc., Plymouth, Mich.
[21] Appl. No.: 872,906
[22] Filed: Apr. 23, 1992
[51] Int. Cl.⁵ .......................................... F16M 13/00
[52] U.S. Cl. .................................. 248/429; 296/65.1
[58] Field of Search ............... 248/419, 424, 429, 430; 296/65.1; 297/344

[56] References Cited

U.S. PATENT DOCUMENTS

| | | | |
|---|---|---|---|
| 4,635,890 | 1/1987 | Matsuda et al. | 248/429 |
| 4,730,804 | 3/1988 | Higuchi et al. | 248/429 |
| 4,781,354 | 11/1988 | Nihei et al. | 248/430 X |
| 4,813,643 | 3/1989 | Nihei | 248/430 |

Primary Examiner—Ramon O. Ramirez
Attorney, Agent, or Firm—Harness, Dickey & Pierce

[57] ABSTRACT

A seat assembly with an irreversible pawl adjusting latch mechanism in which a pawl with a plurality of teeth for insertion into apertures in a latch plate is provided with a portion of the teeth having edge surfaces inclined relative to the latch plate apertures so that upon insertion a wedge fit of the teeth into the apertures is provided to eliminate backlash in the latch mechanism. The pawl also includes a locking tooth having edge surfaces parallel to the latch plate apertures which, upon contact with the edges of the latch plate apertures prevent disengagement of the pawl from the latch plate due to fore and art loading on the seat assembly.

4 Claims, 4 Drawing Sheets

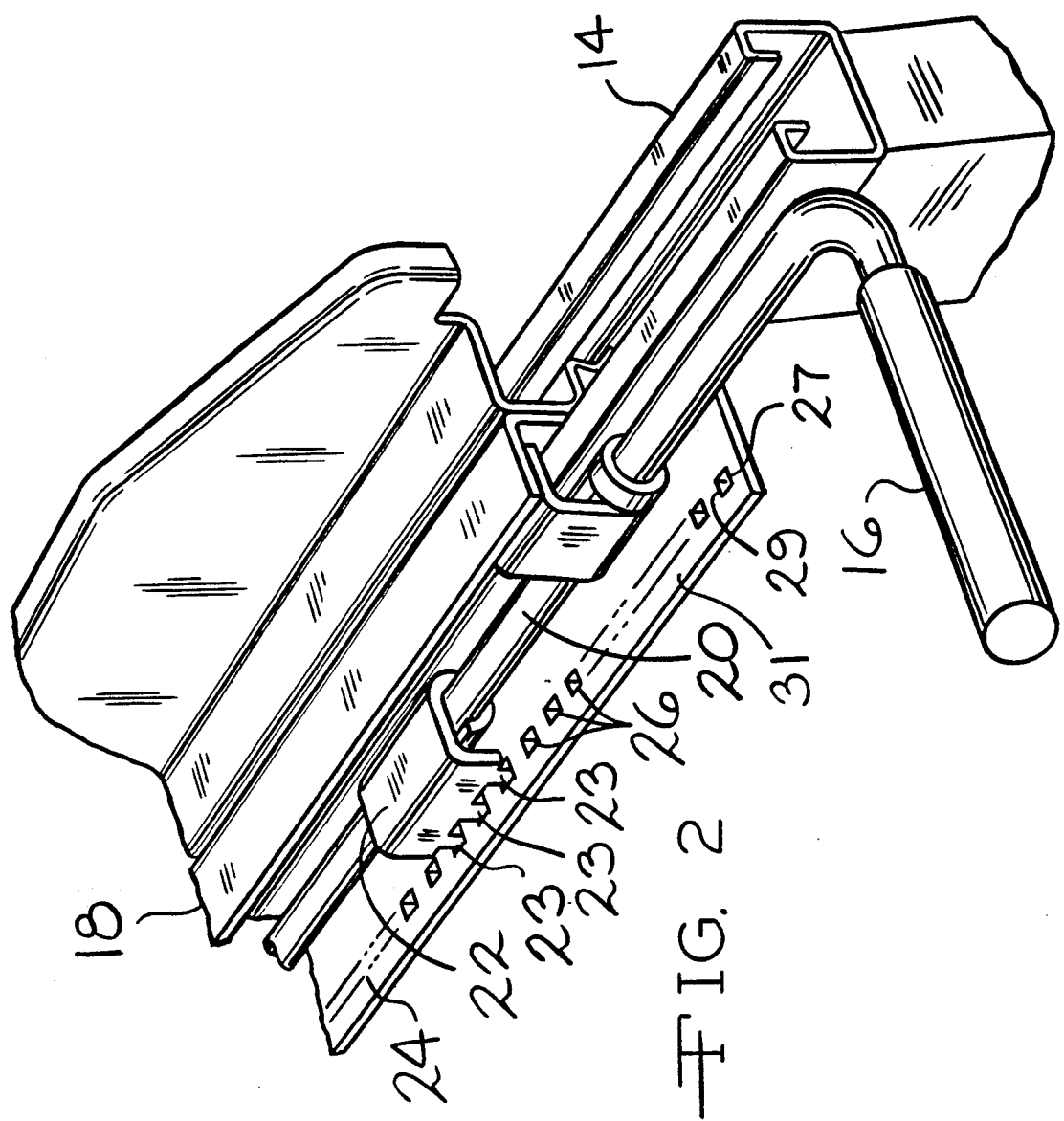

SEAT ASSEMBLY WITH IRREVERSIBLE PAWL ADJUSTING LATCH MECHANISM

BACKGROUND AND SUMMARY OF THE INVENTION

The present invention relates to a vehicle seat assembly having a manual adjusting latch mechanism. The latch mechanism is provided with an irreversible pawl containing two sets of teeth to allow a tight engagement between the fixed and moving components of the latch mechanism while preventing reversal of tooth engagement under loading.

The use of a toothed pawl which engages a latch plate containing a plurality of locking apertures is a well known means of constructing a manually-operated latch to provide selective fore and aft movement of a seat in a vehicle. To facilitate engagement and to prevent backlash in the latch assembly, it is desirable to taper the edge surfaces of the pawl teeth to create a positive engagement angle so that the teeth may be wedge-fit into the openings in the latch plate upon release of the adjusting lever. In such a wedge fit, the angled surfaces of the teeth contact the edge of the locking apertures, resulting in a snug fit without backlash in the latch mechanism.

A tooth configuration employing wedged teeth therefore eliminates backlash in the latch mechanism. The engagement angle on each of the teeth must be made large enough to ensure an acceptable tooth length, since teeth which are too long are more prone to shear failure when loaded. However, a large engagement angle for the tooth surfaces facilitates disengagement of the teeth from the apertures under loading since the tapered teeth will then have a tendency to slide out of engagement along the wedging surfaces. A configuration employing only wedged teeth is therefore unacceptable because the engagement angle on each of the teeth must be so large to avoid an unacceptably long tooth that the resulting tooth configuration may be disengaged from the latch plate when subjected to loading, such as during a vehicle collision.

Consequently, it is an object of the present invention to provide a manual latch mechanism for a vehicle seat which possesses the desired characteristic of irreversibility under loading while eliminating backlash between the pawl teeth and locking apertures.

The teeth of the irreversible pawl of the present invention can be engaged and disengaged with the locking apertures in a latch plate by pulling on the seat adjusting lever. The present invention provides the pawl teeth with two sets of faces, inclined and parallel with respect to the locking apertures. In a particular embodiment of the invention, the pawl has two sets of teeth: one or both of the surfaces of the first set of teeth (the "wedging" teeth) are angled with respect to the locking apertures to form a positive engagement angle, providing a wedging fit. The surfaces of the second set of teeth (the "locking" teeth) are substantially parallel with the locking apertures to prevent movement and consequent disengagement when the seat is loaded.

Additionally, the width of the locking teeth may be chosen to provide a clearance fit between the teeth and the locking apertures, since the wedging surfaces on the wedging teeth already fit snugly in the locking apertures. Such a clearance fit facilitates easy engagement of the locking teeth with the locking apertures and allows for larger tolerances in the manufacture of the locking apertures.

Further objects, features, and advantages of the present invention will become apparent from a consideration of the following description and the appended claims when taken in connection with the accompanying drawings.

DESCRIPTION OF THE DRAWINGS

FIG. 2 is a perspective view of the manual seat adjustment latch with the irreversible pawl of the present invention;

DETAILED DESCRIPTION OF THE INVENTION

Figure 1:
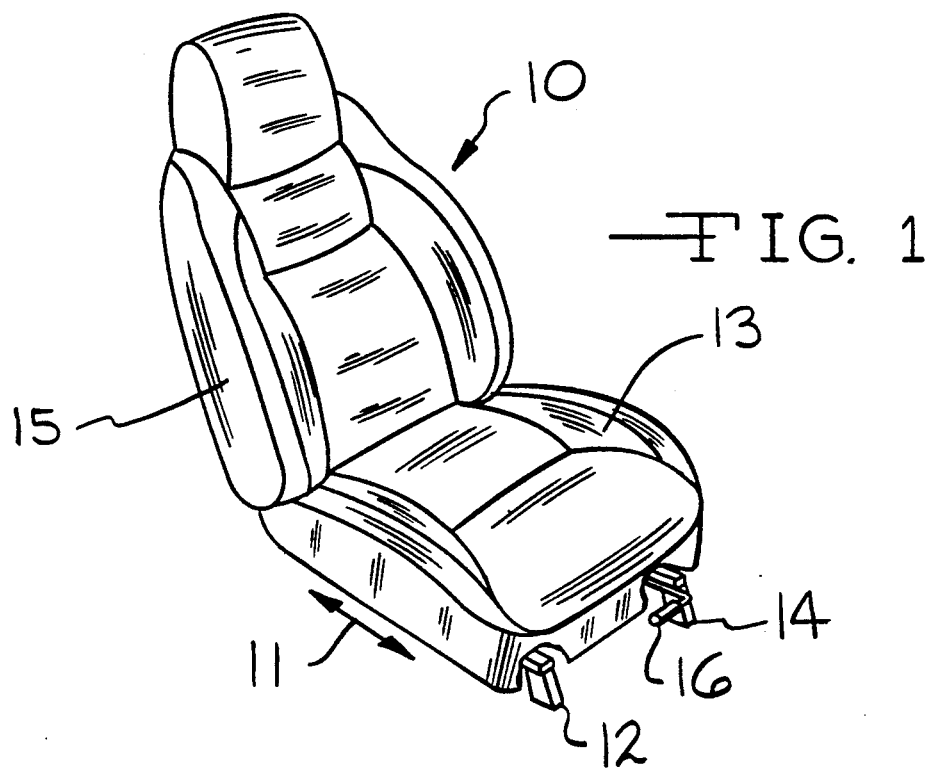
FIG. 1 is a perspective view of a vehicle seat assembly having a manual latch with the irreversible pawl of the present invention.

A seat assembly 10 having the irreversible pawl adjusting latch mechanism of the present invention is shown in FIG. 1. Seat assembly 10 includes a seat cushion 13 and seat back 15 and a mechanism for adjustment of the seat fore and aft in a vehicle, as indicated by arrow 11. The seat assembly 10 further includes fixed rails 12 and 14 mountable to a vehicle floor pan on the lateral sides of the seat assembly. A handle 16 is provided to allow the occupant to adjust the seat position by turning the handle, sliding the seat assembly on rails 12 and 14 to the desired position, and subsequently releasing the handle.

Referring to FIG. 2, which shows the adjustment mechanism in more detail, slide rail 18 is movably mounted to fixed rail 14 by roller bearings not shown or other means equally well known in the art to facilitate fore and aft movement of the seat assembly. Handle 16 is secured to arm 20 and suitably biased by spring means, not shown, which ensures positive engagement of the latch mechanism at all times when the operator is not adjusting the seat position. During operation of the latch mechanism, arm 20 rotates about its longitudinal axis. Arm 20 is itself carried by slide rail 18 by means which are well known in the art. Pawl 22, which is shown here with three teeth but which may contain more or fewer teeth without departing from the spirit of the present invention, is secured to arm 20. When the seat adjustment latch is in the engaged position shown in FIG. 2, pawl teeth 23 fit into locking apertures 26 contained in latch plate 24 connected to the fixed rail 14. The locking apertures 26 are oriented in a linear array in the latch plate 24 extending fore and aft relative to the seat assembly and the motor vehicle. Each of the locking apertures 26 has a length between the front edge 27 and the rear edge 29 as nearly equal to that of the other apertures as possible but some deviation due to manufacturing tolerances will exist. The apertures extend into the latch plate 24 in a direction normal to the latch plate surface 31. Insertion of the teeth 23 into the locking apertures 26 prevents fore and aft movement of the slide rail 18.

Figure 3:
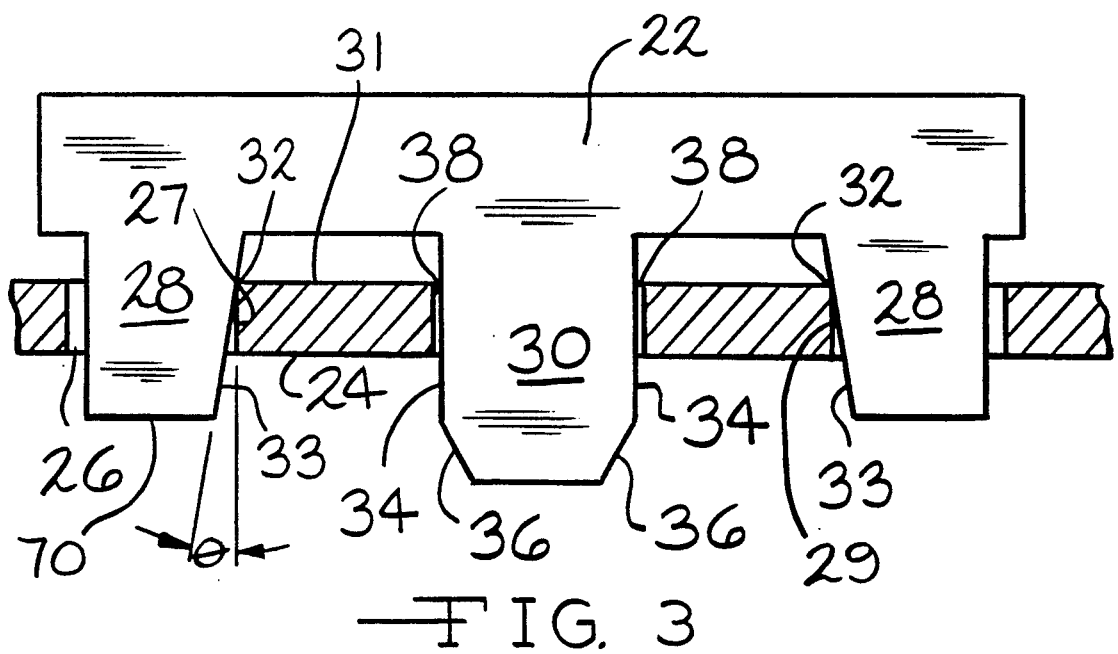
FIG. 3 is a side view of the pawl teeth engaged in the locking apertures in the latched position showing the geometry of the pawl teeth.

Referring now to FIG. 3, it can be seen that the pawl has two types of teeth, wedging teeth 28 and locking teeth 30 having dissimilar shape and profile. Wedging teeth 28 have at least one edge surface 33 which is inclined at an angle $\Theta$ to the normal of surface 31 of latch plate 24 with the teeth tapering in width to distal ends 70. This facilitates a wedge fit between the teeth 28 and the locking apertures in order to eliminate backlash in the latch mechanism. As the pawl teeth are inserted into the locking apertures, the wedging teeth contact the front and rear edges 27 and 29 of the apertures at wedging points 32.

Figure 4:
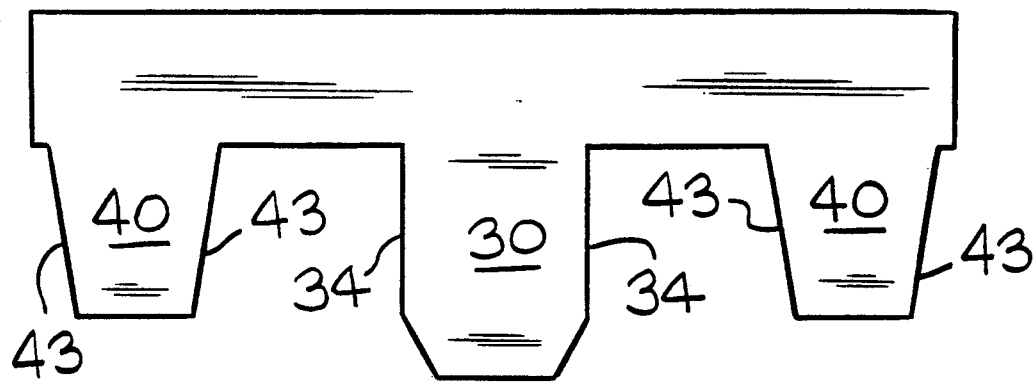
FIG. 4 is a side view of the pawl teeth in a second embodiment of the invention, showing a modified geometry of the pawl teeth.

If $\Theta$, the angle of inclination of the wedging teeth, is chosen to be very small, long teeth will be needed to ensure a proper wedge fit within the tolerance range of the aperture length. Excessively long teeth are difficult to insert into the locking apertures 26 and are prone to shear failure under loading. An acceptable value for $\Theta$ therefore must ensure a reasonable tooth length and relative ease of insertion into the apertures. An angle of three degrees or greater has been found to assure an acceptable tooth length. The inclined edges 33 of teeth 28 serve as wedging surfaces, allowing the teeth 28 to travel into locking apertures 26 until contacting a corner of the rail at wedging points 32. In the embodiment shown in FIG. 4, wedging teeth 40 are provided with two inclined surfaces 43 rather than only a single inclined surface, as with the wedging teeth 28 in FIG. 3.

When a load is applied to the seat assembly in the direction of arrow 11, it can be seen that the wedging teeth will be forced out of the locking apertures whenever $\mu$, the coefficient of friction between the teeth and the locking apertures, satisfies the relation $\mu < \tan \Theta$. To prevent disengagement of the pawl from the latch plate, the locking teeth 30 are provided with two edge surfaces 34 which are substantially parallel to the normal to the latch plate surface 31. These substantially parallel surfaces ensure that when seat assembly 10 is subjected to a load, the pawl teeth do not disengage from the locking apertures 26. The load urges the surfaces 34 of the locking teeth into parallel contact with the edges of locking apertures 26. Since the surfaces are substantially parallel, the angle between the surfaces is zero and there is minimal or no force component in the direction of sliding motion so there is no tendency for the locking teeth to move relative to the latch plate.

Figure 5:
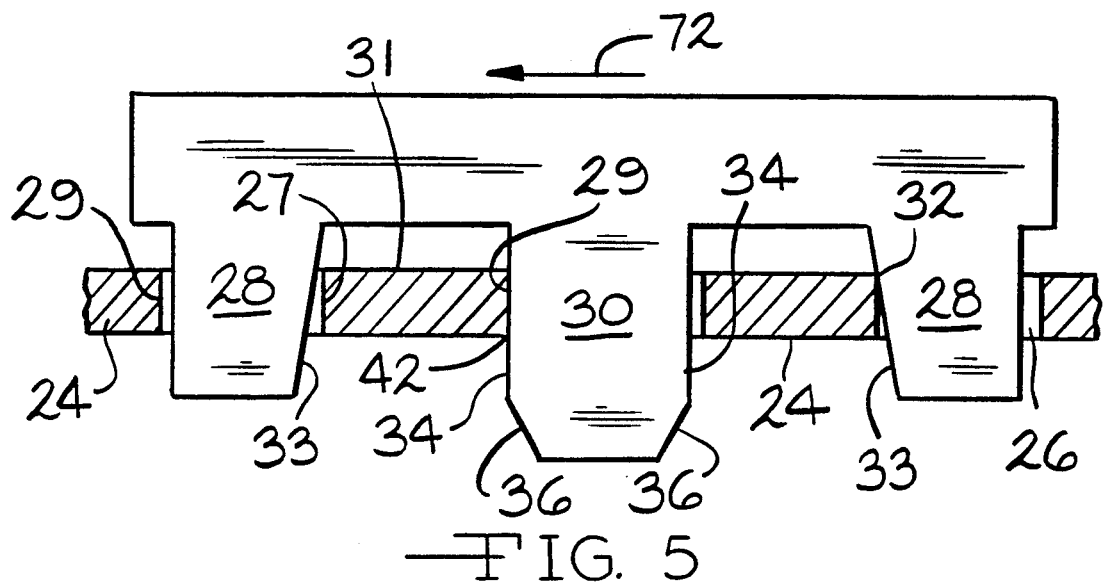
FIG. 5 is a side view of the position of the pawl teeth when in the latched position after the seat assembly has been subjected to loading.

Operation of the pawl under load is shown in FIG. 5 where the pawl is being forced to the left as shown by arrow 72. Upon initial loading, the inclined surfaces 33 of the wedging teeth 28 may allow some movement of the pawl toward disengagement. Plastic deformation of the teeth and/or apertures typically occurs. The contact point 32 of the right tooth 28 has moved along the inclined tooth surface 33 as the pawl is moved slightly to the left, disengaging the left tooth 28 from the edge of the aperture into which it is inserted. Once the pawl has moved sufficiently for the clearance between locking tooth 30 and the rear edge 29 of the locking aperture to be eliminated, the straight edge 34 of tooth 30 contacts with the edge 29 of locking aperture 26, preventing further disengagement from the locking aperture. The pawl is irreversible since seat loads acting on tooth 30 are normal to the direction of motion to disengage the teeth and cannot force the pawl from engagement.

The locking tooth 30 may be further provided with inclined upper edge surfaces 36 to facilitate alignment with locking apertures 26 by guiding tooth 30 into the locking apertures 26 when the pawl teeth are moved into the locking apertures. The total length of locking tooth 30 is normally chosen to be greater than that of the wedging teeth 28 to further facilitate engagement with the locking apertures 26 since the aperture edge surfaces 36 will encounter locking apertures 26 during latching before wedging teeth 28, which lack similar angled guide surfaces. The width of teeth 30 is further chosen so that some clearance 38 remains between edge surfaces 34 and the edges of locking windows 26 when the wedging teeth are wedged into apertures 26. Clearance 38 facilitates the easy engagement of teeth 30 with locking apertures 26 and may be provided without introducing unwanted backlash into the latch mechanism because wedging teeth 28 already ensure a snug fit between the pawl assembly and the locking apertures 26. A typical value for this clearance is 0.1 mm per tooth side, but larger or smaller values may also produce satisfactory results.

Figure 6:
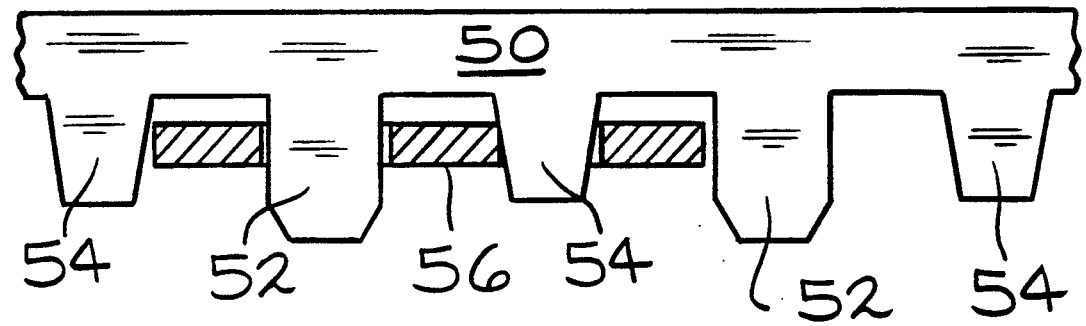
FIG. 6 is a side view of a third embodiment of the latch mechanism of the present invention showing a long rack containing a plurality of teeth and a plate having locking apertures which engage the teeth on the rack.
Figure 7:
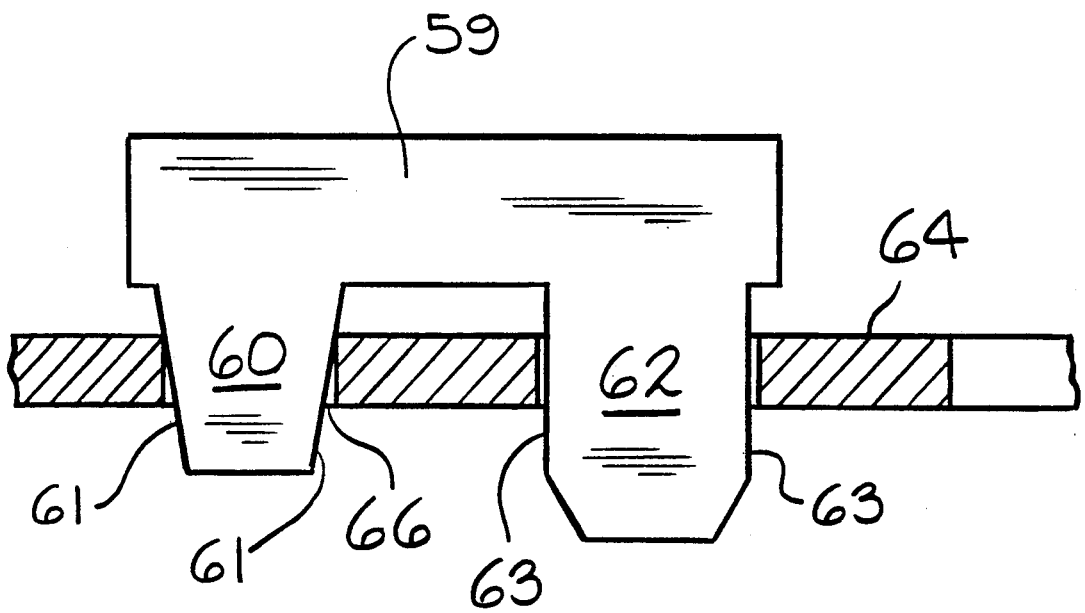
FIG. 7 is a side view of a fourth embodiment of the latch mechanism of the present invention in which the pawl contains only two teeth.

FIG. 6 shows an alternate embodiment of the present invention, in which a long rack 50 containing a row of alternating wedging teeth 54 and locking teeth 52 engages a plate 56 having a plurality of locking apertures by the engagement of teeth 52 and 54 into the apertures in plate 56. In FIG. 7, the irreversible pawl 59 is shown with only two teeth. The wedging tooth 60 is inclined on both edge surfaces 61 relative to the normal to latch plate 64 in order to create a wedge fit. The locking tooth 62 contains two straight edge surfaces 63 to prevent reversal of the engagement under loading. It should be understood that two, three or more teeth may be provided without departing from the scope of the present invention. Furthermore, it is also possible to reverse the orientation of the pawl and latch plate 24 so that the pawl 22 is movably mounted to the fixed rail 14 while plate 24 is mounted to slide rail 18.

The present invention therefore solves the problem of preventing backlash in a manual seat adjustment mechanism while ensuring irreversibility of the mechanism under loading, particularly during a vehicle collision. By the provision of teeth with inclined wedging surfaces and substantially parallel locking surfaces, a snug wedge fit between the teeth and locking apertures which cannot be disengaged under fore and aft loading of the seat is assured. It is noted that the first-described embodiment of the present invention has passed a rigorous impact test.

The foregoing description shows only the preferred embodiment of the present invention. Various modifications may be apparent to those skilled in the art without departing from the scope of the present invention as defined in the following claims.

I claim:

1. A latch mechanism for a vehicle seat assembly having a fixed rail for mounting said seat assembly to a vehicle, a slide rail movably mounted to said fixed rail for movement fore and aft relative to said fixed rail to move said seat assembly in the vehicle, said latch mechanism being operable to hold said slide rail in place on said fixed rail and being selectively releasable to allow adjustment of said seat assembly, said latch mechanism comprising:

an elongated latch plate mounted to one of said fixed or slide rails having a plurality of locking apertures aligned in a linear array in the fore and aft direction, each aperture having a front and a rear edge and extending into said latch plate in a direction normal to a face of said latch plate;

a pawl movably mounted to the other of said fixed or slide rails, said pawl having at least two teeth insertable into said locking apertures in a lock position and removable from said apertures in a release position, said teeth extending from a main body portion of said pawl to distal ends and each tooth having a front and rear surface whereby said at least two teeth together have at least two front surfaces and at least two rear surfaces;

said at least two teeth together having at least one front surface and at least one rear surface at an incline to said normal direction whereby the teeth taper from said main body portion to said distal ends of said teeth, said inclined surfaces being located on said pawl so as to ensure engagement of said inclined surfaces with the front and rear edges respectively of the locking apertures into which said teeth are inserted in said lock position considering the normal manufacturing variation in the sizes of said apertures and said teeth whereby backlash caused by gaps between said latch plate and said pawl is eliminated; and said at least two teeth together further having at least one normal front surface and at least one normal rear surface that are normal to said latch plate face and which are located on said pawl so as to ensure no engagement between said normal surfaces and said front and rear aperture edges respectively into which said teeth are inserted in said lock position considering the normal manufacturing variation in the sizes of said apertures and said teeth whereby upon deformation of said latch plate and pawl during fore or aft loading or upon partial withdrawal of said teeth from said apertures during fore or aft loading one of said normal front and rear surfaces will engage a front or rear aperture edge.

2. The latch mechanism of claim 1 wherein:

said pawl includes a wedge tooth having front and rear surfaces that are inclined such that said wedge tooth has a width at the base of said wedge tooth greater than the width of said apertures and a width at the distal end of said wedge tooth that is less than the width of said apertures to ensure that said wedge tooth is insertable into said apertures and engageable with both the front and rear aperture edges; and said pawl includes a lock tooth having front and rear surfaces normal to said latch plate face whereby said lock tooth has a uniform width along the length of said lock tooth.

3. The latch mechanism of claim 2 wherein said lock tooth extends from said pawl base portion a greater distance than said wedge tooth and the portion of said lock tooth extending beyond said wedge tooth tapers in width toward said distal end to facilitate alignment of said lock and wedge teeth with said apertures.

4. The latch mechanism of claim 1 wherein said inclined front and rear surfaces are inclined from said normal direction at an angle of inclination of more than three degrees.

* * * * *